United States Patent [19]

Bahiman

[11] 4,405,184

[45] Sep. 20, 1983

[54] UNIDIRECTIONAL FLEXURAL PIVOT

[75] Inventor: Hossein Bahiman, Landover Hills, Md.

[73] Assignee: The United States of America as represented by the Administrator of the National Aeronautics and Space Administration, Washington, D.C.

[21] Appl. No.: 243,684

[22] Filed: Mar. 16, 1981

[51] Int. Cl.³ .............................................. F16C 11/12
[52] U.S. Cl. .................................................... 308/2 A
[58] Field of Search ....................... 308/2 A, 2 R, 26; 74/5 F; 267/160, 158; 464/69, 57, 81, 83, 56

[56] References Cited

U.S. PATENT DOCUMENTS

| 854,426 | 5/1907 | Lowry | 464/69 X |
|---|---|---|---|
| 1,013,786 | 1/1912 | Lambert | 464/69 |
| 1,334,557 | 3/1920 | Ruff | 464/57 |
| 1,602,912 | 10/1926 | Leipert | 464/56 |
| 1,952,970 | 3/1934 | Brofelth | 464/81 |
| 2,484,823 | 10/1949 | Hammond | 308/2 A X |
| 3,060,334 | 10/1962 | Favre | 267/160 X |
| 3,181,851 | 5/1965 | Troeger | 308/2 A X |
| 3,188,071 | 6/1965 | Owen | 308/2 A X |
| 3,469,417 | 9/1969 | Wakelin | 464/83 |
| 3,909,077 | 9/1975 | Leonarduzzi | 308/2 R |

Primary Examiner—Stuart S. Levy
Assistant Examiner—Scott J. Haugland
Attorney, Agent or Firm—John O. Tresansky; John R. Manning; Robert E. Bushnell

[57] ABSTRACT

A pair of generally coaxial mutually rotatable cylindrical outer ring members (34, 36) are held in spaced apart relationship by three parallelogram shaped relatively thin, flexible, flat planar spring elements (48, 50, 52) which are substantially inextensible in length and are joined to the inside of the outer ring members and held in position by arcuate inner ring segments (38, 40 . . . 46), three for each outer ring member, which respectively span an arc of substantially 120°. The parallelogram shape of the spring elements (48, 50, 52) provides a slanted interconnection between the outer ring members (34, 36). The direction of slant, moreover, determines in which direction the spring elements (48, 50, 52) can flex or bend unidirectionally to relieve the compression stress imparted thereto by any mutual angular rotation of the outer ring members (34, 36).

11 Claims, 5 Drawing Figures

UNIDIRECTIONAL FLEXURAL PIVOT

ORIGIN OF THE INVENTION

The invention described herein was made by an employee of the United States Government and may be manufactured and used by or for the Government for governmental purposes without the payment of any royalties thereon or therefor.

TECHNICAL FIELD

The invention relates generally to mechanical bearings and more particularly to flexural pivot type bearings.

Background Art

Cross spring element bearings or flexural pivots, as they are commonly referred to, are known to those skilled in the art. Such devices provide frictionless bearings which require no lubrication and are particularly suitable for small angular deflection. One known prior art flexural pivot includes a pair of spaced outer rings and a pair of half rings inserted within the outer ring pair and extend between the outer rings. One of the half ring members is brazed to the inner surface of one of the outer rings while the other half ring is brazed to the inner surface of the other outer ring. These ring members are interconnected by means of generally rectangular flexible spring elements which permit the outer rings to rotate with respect to one another without substantial axial movement.

One of the major limitations of this type of flexural pivot is that when the outer rings are twisted about each other, the inner half ring portions that are not brazed to the outer rings rotate toward the brazed portions of the inner half rings and accordingly move transversely relative to the central axis toward the outer ring. This transverse movement places tension on the flexible interconnecting spring elements causing excessive stress to form at the point where the springs are connected to the unbrazed portions of the inner half springs. This stress build-up causes premature failure of the spring elements by fracturing at the point of stress.

STATEMENT OF THE INVENTION

Accordingly, it is an object of the present invention to provide an improvement in frictionless bearings.

Another object of the invention is to provide improvement in frictionless bearings of the flexural pivot type.

Still another object of the invention is to provide a flexural pivot which is unidirectional in operation.

A further object of the invention is to provide a flexural pivot which eliminates undesired bending moments tending to cause premature failure.

These and other objects are provided in accordance with a flexural pivot comprised of two adjacent cylindrical members, each of which includes an outer shell portion and an inner shell portion, with the inner shell portions divided into plural equal segments from which parallelogram shaped flat planar spring elements extend across the inner space between the adjacent cylindrical members. The spring elements are adapted to flex in but one predetermined direction for mutual rotation of the cylindrical members depending upon the slanted orientation of the spring elements within the inner shell portions.

The foregoing as well as other objects, features and advantages of the invention will become more apparent from the following detailed description when taken in conjunction with the appended drawings.

DETAILED DESCRIPTION OF THE INVENTION

Figure 1:
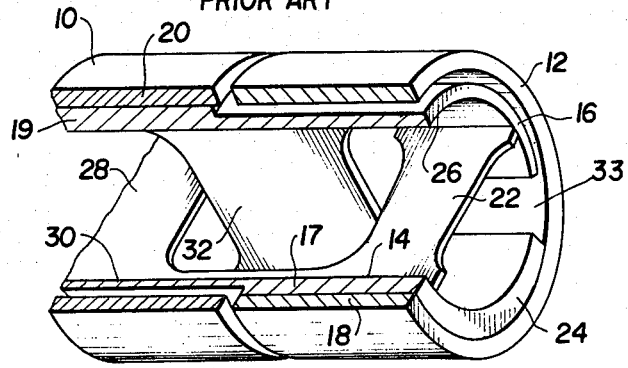
FIG. 1 is a partially cut away perspective view of a known prior art flexural pivot.

Referring now to the drawings and more particularly to FIG. 1, there is disclosed a flexural pivot typically illustrative of the prior art. As shown, the pivot is comprised of a pair of spaced outer rings 10 and 12 within which are inserted a pair of inner half rings 14 and 16 which extend between the outer rings. The inner half ring 14 includes a thick portion 17 which is brazed at the surface 18 to the inside surface of the outer ring 12 while the other inner half ring 16 includes a thickened portion 19 which is brazed at the surface 20 to the inner surface of the outer ring 10. The inner half rings 14 and 16 are separated with respect to each other so that the outer rings 10 and 12 can rotate with respect to one another.

A first generally rectangular shaped thin flexible flat spring element 22 is bonded to the brazed portion 24 of the inner half ring 14 and the opposed unbrazed portion 26 of the other half ring 16. A second generally rectangular shaped thin flexible flat spring element 28 is bonded to the brazed portion, not shown, of the inner half ring 16 and the unbrazed portion 30 of the half ring 14. In such an arrangement, the flat spring elements 22 and 28 lie in the same plane. A third, relatively larger, rectangularly shaped, thin flexible flat spring element 32 is connected between the two half rings 14 and 16 intermediate spring elements 22 and 28 but oriented in a plane perpendicular to the plane of the co-planar springs 22 and 28. In such a configuration, the outer rings 10 and 12 are prevented from separating axially but are able to twist or rotate with respect to one another by an amount determined by the separation 33 between the inner half ring portions 24 and 26.

While such a configuration is adapted to operate as intended, it nevertheless suffers from the disadvantage of being susceptible to premature failure due to the fact that when the outer rings 10 and 12 are twisted about each other, the sections 30 and 26 of the inner half ring portions 14 and 16 that are not brazed to the outer rings 10 and 12 tend to move transverse to the central longitudinal axis towards the respective outer rings. This transverse movement places tension on the flexible spring elements 22, 28 and 32, causing excessive stress to form at the point where the spring elements are respectively connected to the unbrazed portions of the inner half springs. This stress build up eventually causes the elements 22, 28 and 32 to fracture at the point of stress and thus prematurely fail.

Figure 2:
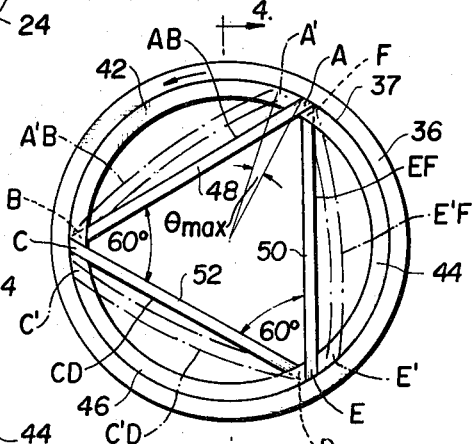
FIG. 2 is an end planar view of the preferred embodiment of the subject invention.
Figure 3:
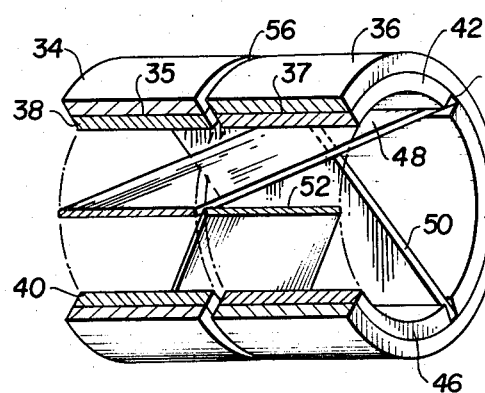
FIG. 3 is a partially cut away perspective view of the preferred embodiment of the invention.
Figure 4:
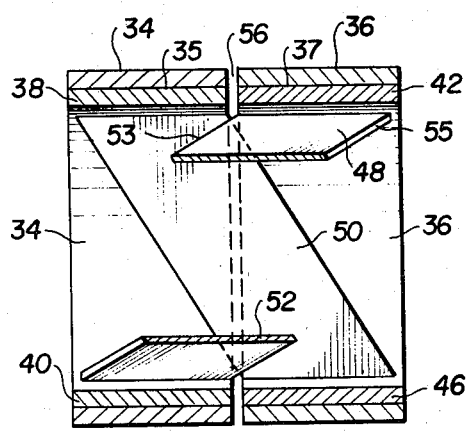
FIG. 4 is a central longitudinal cross section of the preferred embodiment of the invention taken along the lines 4—4 of FIG. 2.

Referring now to the preferred embodiment of the invention which is exemplified in FIGS. 2 through 4, taken collectively, reference numeral 34 denotes a first cylindrical outer ring member of substantially uniform thickness while reference numeral 36 denotes an identical second cylindrical outer ring member axially spaced from the first member 34. Inside of each of the outer ring members 34 and 36 there is located three substantially identical ring segments which are respectively brazed to the inner wall surfaces 35 and 37 of the outer rings. As best illustrated in FIG. 3, which is a cut-away view, reference numerals 38 and 40 represent two of the three ring segments located inside of the first outer ring member 34; however, three ring segments 42, 44 and 46 are shown located inside of the second outer ring member 36. All of the inner ring segments 38 . . . 46 are of uniform thickness and respectively span an arc of substantially 120°.

Figure 5:
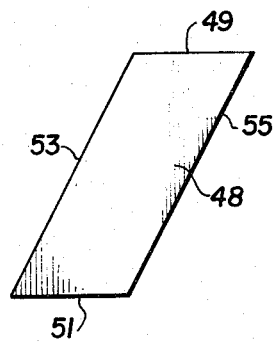
FIG. 5 is a front planar view of one of the spring elements shown in FIGS. 2 through 4.

The inner ring segments, moreover, are adapted to position and hold three relatively thin flat planar spring elements 48, 50 and 52 which are flexible but substantially inextensible in length by being fabricated, for example, from sheet metal. The elements 48, 50 and 52, moreover, are in the form of a parallelogram such as the rhomboid shown in FIG. 5. The three spring elements each have a pair of short parallel edges 49 and 51 and a pair of relatively longer parallel edges 53 and 55, and accordingly do not increase in length between the edges 49 and 51 along a longitudinal axis in the plane of the elements. The parallelogram shaped spring elements 48, 50 and 52 criss-cross one another in a slanted configuration as shown in FIGS. 3 and 4. The flexible spring element 48, for example, is joined to the outer ring 36 along one short edge 49 at the spacing 54 by being brazed to the segments 42 and 44 while its opposite edge 51 is joined to the outer ring 34 by being brazed to the segments 38 and 40 at a spacing, not shown. The other two flexible spring elements 50 and 52 are joined in a like manner to outer ring 34 and 36 segments so that any lateral movement therebetween is prevented. Also contact between the parallelogram shaped spring elements is prevented.

In such a configuration, the two outer ring members 34 and 36 are constrained and axial movement is prevented while still maintaining a small separation as shown in the figures by reference numeral 56. In the cross sectional view of the invention as shown in FIG. 2, each of the flexible spring elements 48, 50 and 52 form an interior angle of 60°. What is significant, however, is that a unidirectional operation is provided by the subject invention in that if, for example, the outer ring 34 is held stationary, the spring elements 48, 59 and 52 will flex or bend as shown in FIG. 2 only when the outer ring 36 is rotated in a counterclockwise direction. This is due to the direction of slant of the three spring elements 48, 50 and 52, since the relative motion stated will tend to shorten the distance between the extremities, i.e. short edges 49 and 51, of the spring element and since they are flexible, will buckle as shown in FIG. 2.

For a counterclockwise rotation of the combination of outer ring member 36 and inner ring members 42, 44 and 46 relative to the combination of outer ring member 34 and inner ring members 38 and 40, extremities A, C and E (FIG. 2) of spring elements 48, 52 and 50 respectively, will rotate counterclockwise through a maximum angle of $\theta_{max}$, to points A', C' and E', respectively, due to the rotation of front ring members 36, 42, 44 and 46. Extremities B, D and F of spring elements 48, 52 and 50, however, still remain fixed relative to the rear ring members 34, 38 and 40. Consequently, the length of arcs A'B, C'D and E'F equals the length of sides AB, CD and EF of equilateral triangle ABC.

Motion for the opposite (clockwise) direction of rotation of ring 36 is impossible because such a rotation tends to lengthen the respective spring elements but since they are inextensible in their lengthwise direction between edges 49 and 51 the pivot is prevented from turning and thus a unidirectional action is achieved. If it is desirable to make the outer ring 36 unidirectional in the clockwise direction, the slant of each of the spring elements 48, 50 and 52 is merely reversed.

In either case elements 48, 50 and 52 will flex or bend to relieve the compression stress imparted to the springs by the angular rotation. Thus there is no stress built up on the spring elements 48, 50 and 52 to cause them to fracture as in the case of known prior art devices. Because there is no stress on the spring elements, premature fracture is obviated, resulting in a flexural pivot which will exhibit a relatively long useful life.

Having thus shown and described what is at present considered to be the preferred embodiment of the invention, all modifications, changes and alterations coming within the spirit and scope of the appended claims are herein meant to be included.

I claim:

1. A unidirectional flexural pivot, comprising:
a pair of pivot means (34, 36) located adjacent one another and generally coaxially aligned and mutually rotatable around a central axis, said pivot means being spaced apart on opposite sides of a single plane transversing said central axis and having respective inner and outer wall surfaces and a plurality of attachment points (54) located along said inner wall surfaces; and,
a plurality of substantially straight, thin flexible spring element (48/50/52) having opposed flat surfaces extending along a fixed direction of slant relative to the central axis and single plane between said inner wall surfaces of said pair of pivot means and joined at opposite ends (49, 51) of said flat surfaces to said pair of pivot means (34, 36) at a non-diametrically opposing pair of said attachment points (54) located on said inner wall surfaces (35, 37) of different ones of said pivot means wherein said attachment points of said spring elements are axially aligned in pairs on said adjacent pivot means, whereby each of said flat surfaces defines a plane parallel to said central axis and perpendicular to said single plane when said pair of pivot means are at rest and forms a curved surface perpendicular to said single plane and bowed outwardly from said central axis when one of said pivot means is rotated relative to the other of said pivot means in said direction of slant.

2. The flexural pivot as defined by claim 1 wherein said spring elements comprise a plurality of elongated spring elements (58, 50 and 52) joined to said pair of pivot means at pairs of non-diametrically opposing of said attachment points in non-contacting relation with the other of said spring elements.

3. The flexible pivot as defined by claim 2 wherein each of said spring elements (48, 50, 52) has the shape of a parallelogram.

4. The flexural pivot as defined by claim 3 wherein said plurality of spring elements (48, 50, 52) are substantially inextensible in length and comprise three flat, planar springs wherein said planes defined by said flat surfaces of said spring elements project included angles of 60° between adjacent ones of said elements into a plane perpendicular to said central axis when said pair of pivot means are at rest.

5. The flexural pivot as defined by claim 3 wherein each of said spring elements includes a pair of relatively short parallel edges (49, 51) forming said opposite ends and a pair of relatively long parallel edges (53, 55) and wherein said direction of slant of said elements is along the relatively long parallel edges (53, 55) and is selectively chosen to provide a unidirectional rotation of one of said pivot means relative to the other of said pivot means.

6. The flexural pivot as defined by claim 5 wherein the length of said long parallel edges (53, 55) is at least twice the length of said short parallel edges (49, 51).

7. The flexural pivot as defined by claim 3 wherein said pair of pivot means (34, 36) are comprised of cylindrical ring type members including means (38, 40, 42, 44, 46) affixed to said inner wall surfaces (35, 37) for positioning and holding said spring elements (48, 50, 52).

8. The flexural pivot as defined by claim 7 wherein said means (38, 40, 42, 44, 46) on the inner wall surfaces (35, 37) of said cylindrical ring type members (34, 36) comprises three equal length arcuate inner ring segments spanning an arc of substantially 120°.

9. The flexural pivot as defined by claim 8 wherein said cylindrical ring type members (34, 36) have a substantially uniform thickness.

10. The flexural pivot as defined by claim 8 wherein said inner ring segments (38, 40, 42, 44, 46) have a substantially uniform thickness.

11. A unidirectional flexural pivot, comprising:

a pair of substantially identical pivot members of uniform thickness coaxially aligned and mutually rotatable around a central axis, having open facing ends spaced apart on opposite sides of a single plane and inner wall surfaces (35, 37) adjoining said ends;

a plurality of substantially identical ring segments (38, 40, 42, 44, 46) of uniform thickness symmetrically attached to said inner wall surfaces to provide a plurality of spacings (54) between adjacent ones of said segments along said inner wall surfaces;

at least three thin, substantially straight spring elements (48, 50, 52) each made of a flexible, substantially inextensible material having flat, planar surfaces on opposite sides obliquely transversing said central plane and extending in a common direction of slant diagonally relative to said central axis between a circumferentially sequential and non-diametrically opposing pair of said spacings in different ones of said pivot members, wherein each of said spring elements is held out of contact with the others of said elements at longitudinally opposite ends (49, 51) of said planar surfaces within said spacings and attached to said segments whereby said each of said flat surfaces defines a plane parallel to said central axis and perpendicular to said single plane when said pivot members are at rest and forms a curved surface perpendicular to said single plane and bowed outwardly from said central axis when one of said pivot members is rotated relative to the other of said pivot members in said direction of slant.

* * * * *